(12) United States Patent
Van Loon et al.

(10) Patent No.: US 7,560,149 B2
(45) Date of Patent: Jul. 14, 2009

(54) BAGS MADE FROM ETHYLENE COPOLYMER FILMS, AND FILMS AND USES OF SUCH COPOLYMERS FOR MAKING SUCH BAGS

(75) Inventors: Achiel Josephus Van Loon, Schoten (BE); Michael Jan Vinck, Lebbeke (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 199 days.

(21) Appl. No.: 10/902,399

(22) Filed: Jul. 29, 2004

(65) Prior Publication Data

US 2005/0025918 A1 Feb. 3, 2005

(30) Foreign Application Priority Data

Aug. 1, 2003 (GB) .................................. 0318019.7

(51) Int. Cl.
*B32B 27/00* (2006.01)
(52) U.S. Cl. ..................... 428/35.7; 428/34.1; 428/35.2; 428/35.5; 428/36.92
(58) Field of Classification Search ................ 428/34.1, 428/35.2, 35.5, 35.7, 36.92
See application file for complete search history.

(56) References Cited

U.S. PATENT DOCUMENTS 5,382,631 A * 1/1995 Stehling et al. ............. 525/240

FOREIGN PATENT DOCUMENTS

WO WO 93/03093 2/1993

OTHER PUBLICATIONS

"Liquid Chromatography of Polymers and Related Materials III", J. Cazes, editor, Marcel Dekker. 1981, p. 207-235.

* cited by examiner

*Primary Examiner*—Rena L Dye
*Assistant Examiner*—Walter B Aughenbaugh

(57) ABSTRACT

The invention relates to bags with a heat seal zone formed by a composition comprising an interpolymer of ethylene and an alpha-olefin having an MI of from 1.5 to 4.5 g/10 min, preferably from 1.7 to 3.5 g/10 min, and especially from 1.8 to 2.5 g/10 min, and a density of from 0.88 to 0.94 g/cm$^3$, preferably from 0.91 to 0.93 g/cm$^3$ and especially from 0.912 to 0.922 g/cm$^3$, and a CDBI of at least 50%, preferably at least 55% and especially at least 60%, and less than 20 wt % of LDPL; and to uses of films for making such bags.

4 Claims, 3 Drawing Sheets

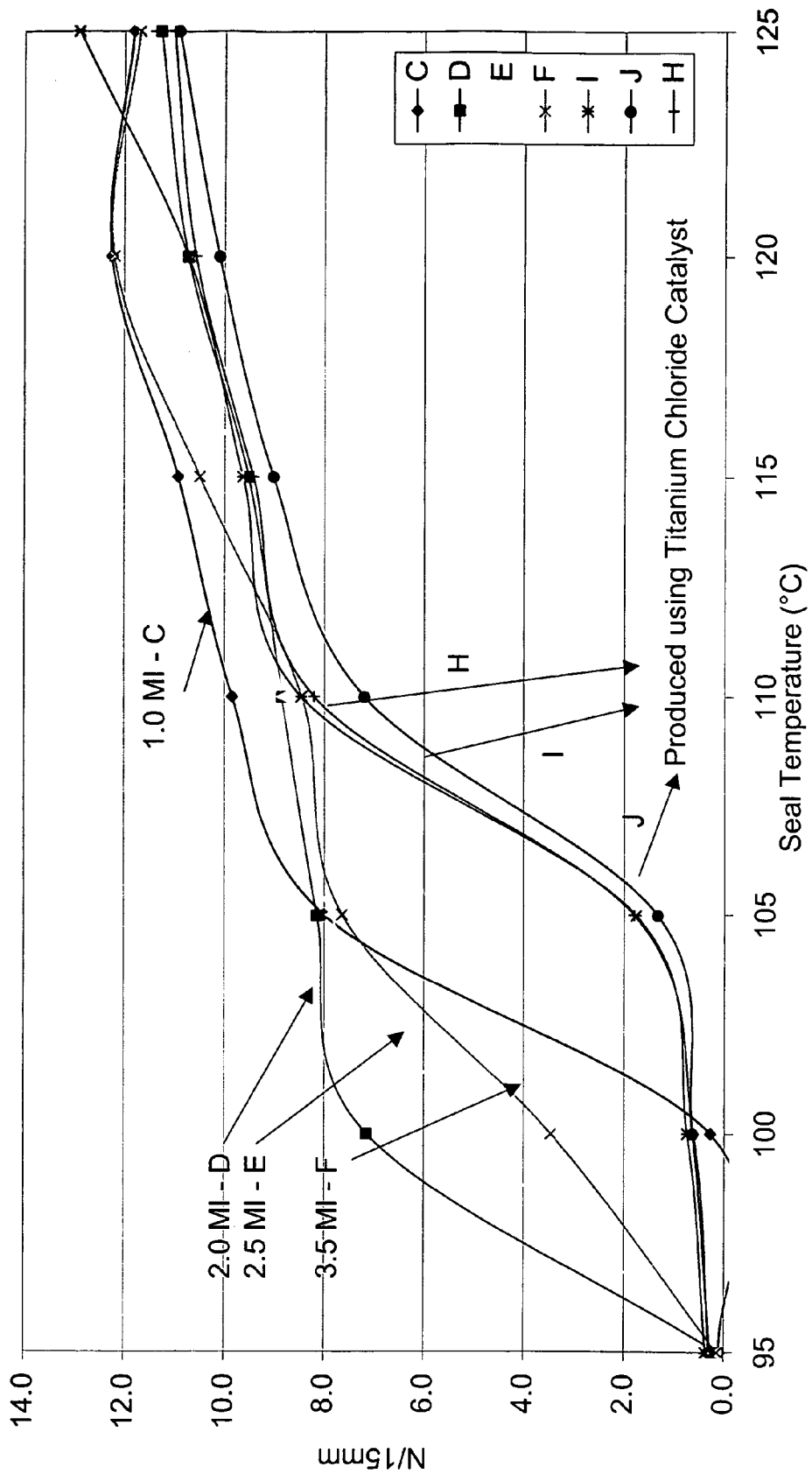

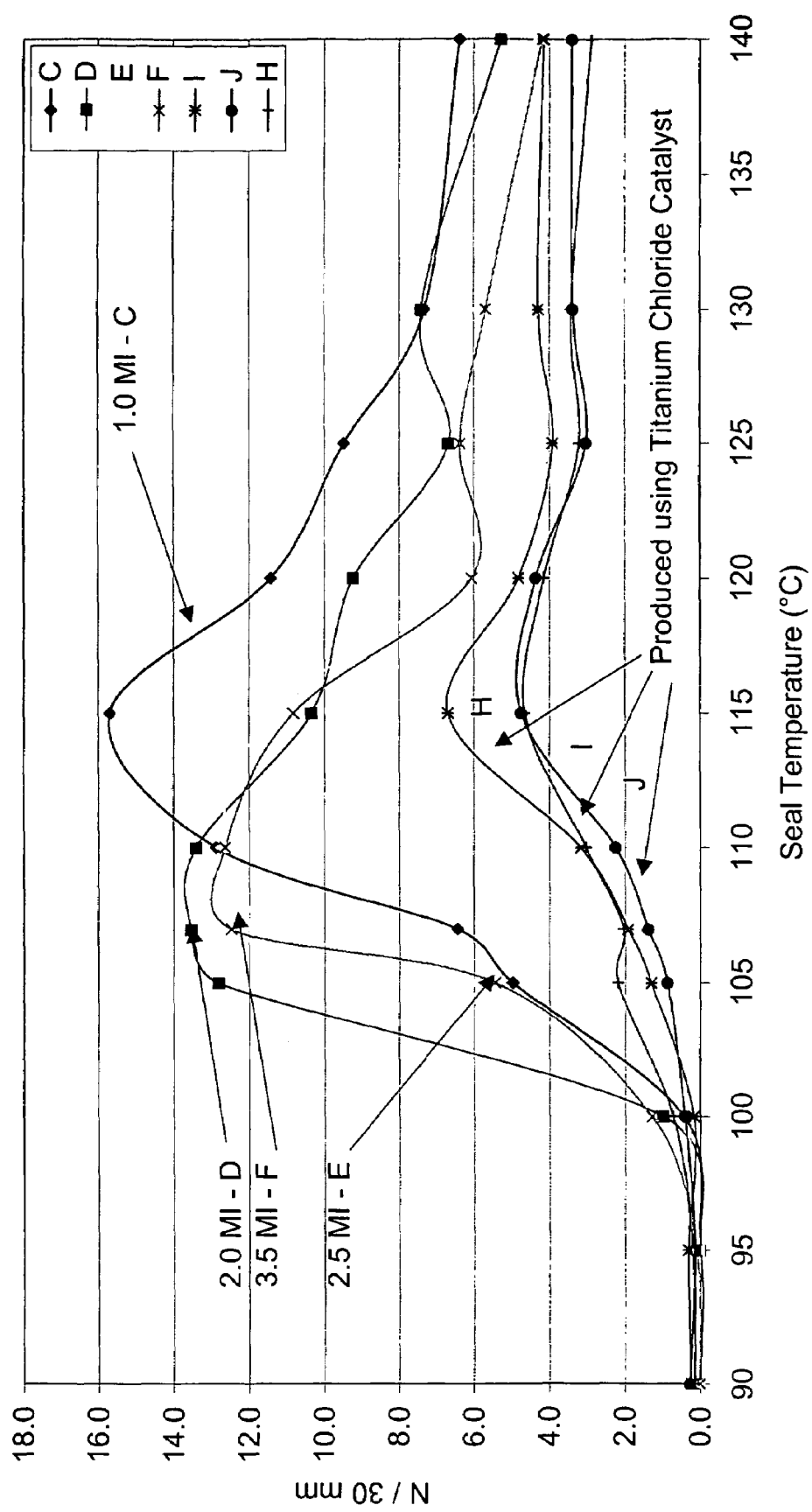

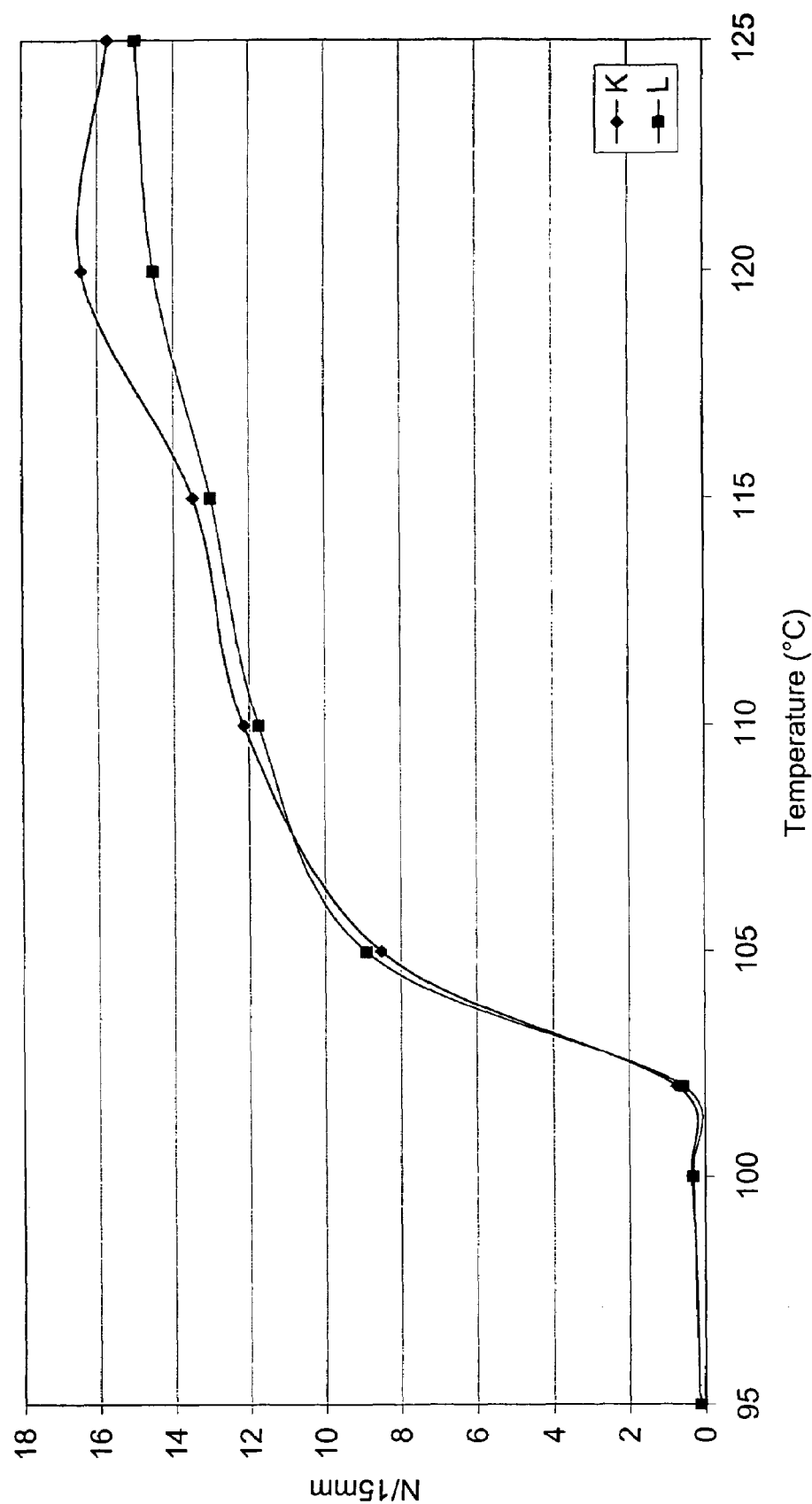

BAGS MADE FROM ETHYLENE COPOLYMER FILMS, AND FILMS AND USES OF SUCH COPOLYMERS FOR MAKING SUCH BAGS

CROSS-REFERENCE TO RELATED APPLICATIONS

The present application claims priority from Great Britain Application No. 03/8019.7, filed Aug. 1, 2003, hereby incorporated by reference.

FIELD OF THE INVENTION

The invention relates to bags made with improved sealing performance made from ethylene copolymer films, and such films and uses of such interpolymers for making such films, for use especially but not exclusively in high speed packaging lines.

BACKGROUND

It is known to convert ethylene based copolymers made using a metallocene catalyst, such as in gas phase or solution or high pressure polymerization, into film by blown film extrusion and cast film extrusion in either a mono or multilayer structure. Such copolymers are sold under the trade name EXACT or EXCEED by ExxonMobil Chemical Company. The composition for the film may comprise a single polymer with the usual additives (anti-oxidant, anti-block additive etc.) It is also known to blend different polymers. An example of that is the use of varying amounts of low density polyethylene made in a high pressure free radical initiated process, referred to as LDPE, with ethylene based copolymers, whether made using metallocene catalyst or the conventional catalyst types produced using titanium chloride as the transition metal component. In the LDPE'S have broad molecular weight distributions and contain significant long chain branching (LCB). In the density range of from 0.91 g/cm$^3$ to 0.94 g/cm$^3$ such copolymers are often referred to as linear low-density polymers, LLDPE's for short.

The conversion of the copolymer composition into film can proceed by two principal routes: A) blown film extrusion, which requires melt strength to sustain the bubble formed as it cools and the polymer composition solidifies; and B) cast film where the molten polymer is cooled on a chilled metal roll. Melt strength is influenced by the molecular weight (the lower the Melt Index (MI) the higher the melt strength at the same extrusion temperature) and LCB. Low MI's of around 1 g/10 min have been favored to achieve bubble stability in blown film extrusion. MI's of over 2.5 g/10 min are favored in cast extrusion to achieve good flowability and reduced neck in. The films produced are frequently converted on the packaging line into some sort of containment structure referred to herein as a bag, which may be a pouch, a bread bag or any other type of bag. A form, fill and seal machine may be used to form the bag.

Once the film has been formed, a critical performance factor is the speed at which the packaging line can be operated. On most bag producing machines, the bottleneck that limits further speed increases of the packaging line is the speed at which the film can be sealed to form the bag. The most important indicators for high line-speed potential are:

A) the heat seal strength (HSS) at different temperatures;

B) the hot tack, which influences the time taken before the product to be packed can be dropped on the freshly made seal and ensure package integrity; and C) the seal initiation temperature (SIT), which determines the lowest temperature at which sufficient heat seal strength is developed to keep the bag closed.

A higher heat seal strength and/or a broader hot tack would provide a broader operating window, lowering the SIT and decreasing the heat seal cycle time and so increase the line speed with which the machine can reliably bag the products. It is among the objects of the invention to broaden the operating window while maintaining a reasonable balance of other properties for processability and film formation.

SUMMARY

We have found surprisingly that small differences in the molecular weight of the ethylene interpolymers can have favorable influence on the sealing behavior of films composition comprising metallocene derived ethylene interpolymers. Such differences are less pronounced to the point of having been ignored in the past using interpolymers derived from classical titanium chloride based catalyst systems.

BRIEF DESCRIPTION OF THE DRAWINGS

FIG. 1 plots the heat seal strength data from Table 3A for 50 μm thick films.

FIG. 2 plots the hot tack data from Table 3A for 50 μm thick films.

FIG. 3 plots the heat seal strength for the blends with 20 wt % LDPE.

DETAILED DESCRIPTION

Various aspects of the invention are more clearly identified in the claims. The invention generally provides in one aspect a bag with a heat seal zone formed by a composition comprising an interpolymer of ethylene and an alpha-olefin having an MI of from 1.5 to 4.5 g/10 min, preferably from 1.7 to 3.5 g/10 min, and especially from 1.8 to 2.5 g/10 min and a density of from 0.88 to 0.94 g/cm$^3$, preferably from 0.91 to 0.93 g/cm$^3$, and especially from 0.912 to 0.922 g/cm$^3$ and a CDBI of at least 50, preferably at least 55% and especially at least 60%, and less than 20 wt % of LDPE. Within the scope of the invention, more than one interpolymer may be used, preferably differing by less than 0.5 in MI g/10 min and less than 0.01 g/cm$^3$ in density.

The interpolymer is preferably of the type containing short chain branches derived from an alpha-olefin comonomer having from 4 to 8 carbon atoms, and preferably from butene-1, hexene-1 and/or octene-1. Such inter-polymers may be made in solution processes, high-pressure processes and heterogeneous processes such as gas phase or slurry polymerization using a transition metal catalyst. The inter-polymers are preferably obtained through processes using single site transition metal catalysts such as metallocene which may be used with activating systems of various types such as aluminum alkyl derivatives, including alumoxane, and/or non-co-ordinating anions such as various boranes or borates. Such catalysts preferably are associated with the presence of Zr or Hf catalyst residues.

It is believed that the effect will be most pronounced by using homogeneous polymer compositions as far as possible. Suitably the heat seal zone is formed by a composition comprising a composition comprising from 85 wt % to 100% of the ethylene interpolymer, preferably at least 90% of the ethylene interpolymer, and especially at least 95 wt % and, a balance of an interpolymer of ethylene and an alpha-olefin having a CDBI less than 50% and/or LDPE. Some long chain branching may be present. However preferably the composition of the heat seal zone contains less than 5 wt % of an LDPE material made in an autoclave or tubular reactor, which generally have a broad molecular weight distribution and significant levels of long chain branches that lead to shear sensitive behavior.

Processing into film of compositions referred to above can be facilitated in blown film extrusion by extruding at a lower temperature to compensate for the lower melt strength resulting from the higher MI. Where the machinery permits, the extrusion temperature can be maintained and the output increased. Use of LDPE as a processing aid can then be reduced or avoided, minimizing the associated disadvantageous effect on the film properties such as reduction in impact strength.

Suitably the bags are made of films having a heat seal strength of more than 50% of the maximum heat seal strength at less than 105° C. and/or a maximum hot tack force at a temperature of less than 110° C.

Film can be adapted for use in making bags according to the invention by providing a heat seal zone extending over at least one surface of the film. The film may then be a monolayer film consisting substantially of the inter-polymer throughout or it may be a multi-layer film, with three or five or more layers, formed by coextrusion or lamination so as to provide a heat zone face on one or both sides.

In another aspect of the invention there is provided the use of an interpolymer of ethylene and an alpha-olefin having an MI of from 1.5 to 4.5 g/10 min, preferably from 1.7 to 3.5 g/10, and especially from 1.8 to 2.5 g/10 and a density of from 0.88 to 0.94 g/cm$^3$, preferably from 0.910 to 0.93 g/cm$^3$, and especially from 0.912 to 0.922 g/cm$^3$ and a CDBI of at least 50, preferably at least 55% and especially at least 60%, and less than 20 wt % of LDPE for improving the hot tack and/or seal strength of a film having a heat seal zone made from such inter-polymer, and preferably so that the film has a heat seal strength of more than 50% of the maximum heat seal strength at less than 105° C. and/or a maximum hot tack force at a temperature at less than 110° C. Such use can help speed up the packaging line speed without significant disadvantage for film properties or film extrusion capacity.

Measurements

Calculations involved in the characterization of polymers by C$^{13}$ NMR for comonomer content follow the work of F. A. Bovey in "Polymer Confirmation and Configuration" Academic Press, New York, 1969. For example hexene content was determined using C$^{13}$ NMR integrating the 2B4 peak at 23.4 ppm.

The Melt Index was determined according to ASTM-1238 Condition E 190° C., 2.16 kg.

Density was determined according to ASTM D4883 on plaques prepared according to ASTM D1928.

Composition Distribution Breadth Index (CDBI) is measured by the procedure described in PCT publication WO93/03093, published Feb. 18, 1993. Fractions having a molecular weight (Mw) less than 15,000 were ignored.

Mw and Mn were measured by GPC (Gel Permeation Chromatography) on a Waters 150 gel permeation chromatograph equipped with a differential refractive index (DRI) detector and Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes, editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customised LALLS software in conjunction with the standard Gel Permeation package.

The heat seal strength (and energy if required) determine the firmness of the seal established at the end of the packaging line after the seal has cooled and stabilized. The procedure for testing it is as follows. Seals were made on a J&B instruments sealing machine. The film was folded between TEFLON™ film and inserted between the sealing bars. At various temperatures, the sealing bars were closed with a pressure of 0.5 MPa for 0.5 seconds. The film was removed from the J&B machine and conditioned for a minimum of 12 hours at 23° C. +/−3° C. and 50% +/−5% humidity.

Seal strength was tested according to the following procedure. After conditioning for a minimum of 12 hours at 23° C. +/−3° C. and 50% +/−5% humidity, the seal strength of 15 mm wide sample was measured in a Zwick tensile instrument under the following conditions: speed 500 mm/min, load cell-200N, and clamp distance 50 mm. The film was placed between the clamps and the clamps were moved apart at a speed of 500 mm/min. During the test the force (N) was recorded as a function of elongation (%). Four test specimens were measured and the average seal strength curve was recorded. The seal strength was the force at which the test specimen registered the maximum force. This is reported in N/15 mm. The seal energy is the integration of the stress/strain curve. The seal energy is the amount of energy (J) necessary to break a seal reportable in J/15 mm.

The hot tack determines the initial seal strength before the film has had much opportunity to cool and represents the force that holds the seals of a bag together on a packaging line after initial sealing for the remainder of the operations on the packaging line. It was measured in the Examples as follows. Seals were made on a J&B instruments sealing machine. The films are laminated to a PET backing tape to prevent stickiness to the sealing bars. Taped films are conditioned at 23±3° C. and 50±5% humidity during a minimum of 12 hours before measuring the hot tack force. Samples were cut into strips of 30±0.5 mm width with a minimum length of 40 cm using a 30 mm Karl Frank cutter. At various temperatures, the sealing bars are closed with a pressure of 0.5 MPa for 0.5 seconds. The seals are allowed to cool down during 0.4 seconds after which the hot tack force is measured by applying a force to opposed sides of the seal according to the following conditions: speed 200 mm/min, a load cell of a piëzo crystal with a sensitivity between 0-100 N. During the test the force (N) was recorded as a function of elongation (%). Four test specimens were measured and the average maximum seal force was recorded. The hot tack strength is the force at which the test specimen registered the maximum force. This is reported in N/30 mm.

The information from the seal strength and hot tack measurements can be used to assess the seal initiation temperature (SIT). A threshold seal strength can be defined and the temperature at which that threshold is reached. A realistic assessment is possible using the heat seal strength data as obtained above and by setting a fixed threshold such as 4 N/15 mm or a threshold expressed as a fraction of the maximum seal strength such as 50% depending on the application.

EXAMPLES

The starting compositions for the films are as follows:

TABLE 1

| Sample | Grade Designation | Monomer types | Comonomer content wt % | Melt Index g/10 min | Mw/Mn | Density g/cm$^3$ | CDBI % |
|---|---|---|---|---|---|---|---|
| A | Exceed MX2027ED* | E-H[1)] | 5.1 | 2.0 | 2.3 | 0.927 | 59 |
| B | Exceed ML1027FE* | E-H | 4.7 | 1.0 | 2.3 | 0.927 | 59 |
| C | Exceed 1018CA* | E-H | 8.0 | 1.0 | 2.3 | 0.918 | 67 |
| D | Exceed ECD357* | E-H | 8.6 | 2.0 | 2.3 | 0.918 | 67 |
| E | Exceed 2518CB* | E-H | 8.8 | 2.5 | 2.3 | 0.918 | 67 |
| F | Exceed 3418CB* | E-H | 9.1 | 3.5 | 2.3 | 0.918 | 67 |
| G | Escorene LD 185 BW** | LDPE | N/A | 2.0 | 4.9 | 0.922 | N/A |
| H | ExxonMobil LL1001XV*** | E-B[2)] | 8.0 | 1.0 | 3.5 | 0.918 | N/A |
| I | ExxonMobil LL1004YB*** | E-B | 8.5 | 2.8 | 3.5 | 0.918 | N/A |
| J | ExxonMobil LL1002YB*** | E-B | 8.8 | 2.0 | 3.5 | 0.918 | N/A |

EXCEED ™ is a trade name owned by ExxonMobil Chemical Company.
E-H indicates ethylene hexene-1 copolymer.
E-B indicates ethylene butene-1 copolymer.
These grades are produced using a non-bridged bis cyclopentadienyl metallocene catalyst and alumoxane supported on silica in a gas phase process.
**This grade is produced in high-pressure polymerization using free-radical initiation on a tubular reactor.
***These grades are produced using a titanium chloride based catalyst and aluminum alkyl supported on silica in a gas phase process.

In the table FE stands for grades containing a blown film additive package containing 1250 ppm erucamide, 750 ppm anti-block additive and anti-oxidant package and polymer processing aid. CA stands for a blown film additive package containing only anti-oxidant and polymer processing aid. CB and YB stand for cast film additive packages containing an anti-oxidant package only and acid scavenger. XV stand for blown film additive package, anti-oxidant package and acid scavenger. BW stands for a blown film additive package containing an anti-oxidant package only.

Mono-Layer Films

Mono-layer films were blown on an Alpine extruder under the conditions in Table 2A (50 μm thick) and Table 2B (25 μm thick). Test data for the resulting films are reported in Table 3 to 9. The comparative examples, not according to the invention are marked with an asterisk.

TABLE 2A

50 μm mono-layer films:

| Polymer Sample | H* MI = 1.0 D = 0.918 | J* MI = 2.0 D = 0.918 | I* MI = 2.8 D = -0.918 | C MI = 1.0 D = 0.918 | D MI = 2.0 D = 0.918 | E MI = 2.5 MI = 0.918 | F MI = 3.5 D = 0.918 | K = 80% C + 20% G | L = 80% D + 20% G |
|---|---|---|---|---|---|---|---|---|---|
| Film Sample | I | II | III | IV | V | VI | VII | VIII | IX |
| Barrell Temp Settings (° C.) | | | | | | | | | |
| Zone 1 | 180 | 180 | 180 | 180 | 180 | 175 | 175 | 190 | 190 |
| Zone 2 | 180 | 180 | 180 | 180 | 180 | 175 | 175 | 190 | 190 |
| Zone 3 | 180 | 180 | 180 | 180 | 180 | 175 | 175 | 190 | 190 |
| Zone 4 | 180 | 180 | 180 | 180 | 180 | 175 | 175 | 190 | 190 |
| Zone 6 | 180 | 180 | 180 | 180 | 180 | 175 | 175 | 190 | 190 |
| Zone 7 | 180 | 180 | 180 | 180 | 180 | 175 | 175 | 195 | 195 |
| Zone 8 | 180 | 180 | 180 | 180 | 180 | 175 | 175 | 195 | 195 |
| Zone 9 | 180 | 180 | 180 | 180 | 180 | 175 | 175 | 195 | 195 |
| Zone 10 | 190 | 180 | 180 | 190 | 180 | 175 | 175 | 200 | 200 |
| Zone 11 | 190 | 180 | 180 | 190 | 180 | 175 | 175 | 200 | 200 |
| Zone 12 | 200 | 180 | 180 | 200 | 190 | 175 | 175 | 200 | 200 |
| Diegap (mm) | 1.5 | 1.5 | 1.5 | 1.5 | 1.5 | 1.5 | 1.5 | 1 | 1 |

TABLE 2A-continued

50 μm mono-layer films:

| Polymer Sample | H* MI = 1.0 D = 0.918 | J* MI = 2.0 D = 0.918 | I* MI = 2.8 D = −0.918 | C MI = 1.0 D = 0.918 | D MI = 2.0 D = 0.918 | E MI = 2.5 MI = 0.918 | F MI = 3.5 D = 0.918 | K = 80% C + 20% G | L = 80% D + 20% G |
|---|---|---|---|---|---|---|---|---|---|
| Cooling Air Temp (° C.) | 21 | 21 | 23 | 22 | 22 | 20 | 20 | 16 | 16 |
| Die Diameter (mm) | 200 | 200 | 200 | 200 | 200 | 200 | 200 | 200 | 200 |
| Melt Temp (° C.) | | | | | | | | | |
| T1 | 193 | 191 | 185 | 205 | 197 | 193 | 185 | 212 | 206 |
| T2 | 201 | 194 | 188 | 207 | 201 | 200 | 190 | 219 | 211 |
| T3 | 203 | 196 | 190 | 208 | 203 | 203 | 191 | 224 | 214 |
| T4 | 200 | 194 | 188 | 207 | 200 | 200 | 189 | 219 | 210 |
| T5 | 191 | 190 | 184 | 201 | 195 | 191 | 183 | 210 | 204 |
| T Melt | 189 | 188 | 181 | 202 | 193 | 188 | 181 | 208 | 202 |
| Melt Pressure (Bar) | | | | | | | | | |
| P1 | 250 | 191 | 154 | 90 | 88 | 75 | 121 | 620 | 447 |
| P2 | 288 | 223 | 191 | 250 | 190 | 189 | 191 | 530 | 533 |
| P3 | 291 | 244 | 217 | 312 | 150 | 166 | 212 | 420 | 281 |
| P4 | 413 | 309 | 289 | 475 | 350 | 293 | 277 | 641 | 471 |
| P5 | 418 | 303 | 286 | 489 | 333 | 309 | 275 | 643 | 474 |
| P6 | 269 | 274 | 257 | 453 | 312 | 288 | 253 | 360 | 367 |
| Screw Speed (RPM) | 38 | 40 | 44 | 38 | 44 | 44 | 40 | 52 | 56 |
| Output (Kg/H) | 78 | 78 | 82 | 80 | 80 | 78 | 78 | 121 | 122 |
| Lay-Flat (mm) | 781 | 785 | 786 | 785 | 785 | 789 | 777 | 785 | 785 |
| BUR | 2.5 | 2.5 | 2.5 | 2.5 | 2.5 | 2.5 | 2.5 | 2.5 | 2.5 |
| Haul-off Speed (m/min) | 18 | 18 | 18 | 18 | 18 | 18 | 19.7 | 28 | 28 |
| Thickness (μm) | 50 | 50 | 50 | 50 | 50 | 50 | 46 | 50 | 50 |

TABLE 2B

25 μm mono-layer films:

| Polymer Sample | C MI = 1.0 D = 0.918 | D MI = 2.0 D = 0.918 | B MI = 1.0 D = −0.927 | A MI = 2.0 D = 0.927 |
|---|---|---|---|---|
| Film Sample | X | XI | XII | XIII |
| Barrell Temp Settings (° C.) | | | | |
| Zone 1 | 180 | 190 | 170 | 175 |
| Zone 2 | 190 | 180 | 175 | 180 |
| Zone 3 | 190 | 175 | 175 | 180 |
| Zone 4 | 190 | 180 | 175 | 180 |
| Zone 6 | 190 | 180 | 185 | 185 |
| Zone 7 | 190 | 180 | 185 | 185 |
| Zone 8 | 190 | 180 | 185 | 185 |
| Zone 9 | 190 | 180 | 190 | 190 |
| Zone 10 | 190 | 180 | 190 | 190 |
| Zone 11 | 200 | 190 | 200 | 200 |
| Zone 12 | 200 | 190 | 200 | 200 |
| Diegap (mm) | 1.5 | 1.5 | 1.5 | 1.5 |
| Cooling Air Temp (° C.) | 20 | 19 | 19 | 19 |
| Die Diameter (mm) | 200 | 200 | 200 | 200 |
| Melt Temp (° C.) | | | | |
| T1 | 224 | 213 | 200 | 199 |
| T2 | 238 | 225 | 206 | 196 |
| T3 | 243 | 229 | 211 | 199 |
| T4 | 237 | 224 | 205 | 196 |
| T5 | 221 | 210 | 198 | 200 |
| T Melt | 213 | 203 | 197 | 193 |
| Melt Pressure (Bar) | | | | |
| P1 | 278 | 107 | N/A | N/A |
| P2 | 358 | N/A | 114 | 245 |
| P3 | 119 | N/A | 113 | 46 |
| P4 | 471 | 345 | 589 | 531 |
| P5 | 524 | 396 | 625 | 533 |
| P6 | 209 | 192 | 246 | 328 |
| Screw Speed (RPM) | 61 | 71 | 49 | 46 |
| Output (Kg/H) | 121 | 123 | 121 | 122 |
| Lay-Flat (mm) | 785 | 785 | 785 | 785 |
| BUR | 2.5 | 2.5 | 2.5 | 2.5 |
| Haul-off Speed (m/min) | 56 | 56 | 56 | 56 |
| Thickness (μm) | 25 | 25 | 25 | 25 |

The sealing behavior was as follows:

TABLE 3A

50 µm film

| Polymer Sample | H<br>MI = 1.0<br>D = 0.918 | J<br>MI = 2.0<br>D = 0.918 | I<br>MI = 2.8<br>D = −0.918 | C<br>MI = 1.0<br>D = 0.918 | D<br>MI = 2.0<br>D = 0.918 | E<br>MI = 2.5<br>MI = 0.918 | F<br>MI = 3.5<br>D = 0.918 | K = 80% C + 20% G | L = 80% D + 20% G |
|---|---|---|---|---|---|---|---|---|---|
| Film Sample | I | II | III | IV | V | VI | VII | VIII | IX |
| Hot Tack Force | | | | | | | | | |
| 90 (all in C) | 0.2 | 0.3 | 0.2 | 0 | 0 | 0 | 0 | 0 | 0 |
| 95 | 0.3 | 0.2 | 0.2 | 0.1 | 0 | 0.1 | 0.1 | 0 | 0.1 |
| 100 | 0.2 | 0.4 | 0.7 | 0.4 | 1 | 0.7 | 1.3 | 0.9 | 1.3 |
| 105 | 1.3 | 0.9 | 2.2 | 5 | 12.8 | 6 | 5.4 | 4.1 | 6.6 |
| 107 | 1.9 | 1.4 | 2 | 6.4 | 13.5 | 11.3 | 12.5 | 8.3 | 12.8 |
| 110 | 3.2 | 2.2 | 3 | 12.9 | 13.4 | 12.8 | 12.6 | 15.2 | 14.6 |
| 115 | 6.7 | 4.7 | 4.7 | 15.7 | 10.3 | 11.4 | 10.8 | 13.7 | 13.5 |
| 120 | 4.8 | 4.4 | 4.1 | 11.4 | 9.2 | 6.6 | 6.1 | 9.6 | 7 |
| 125 | 3.9 | 3 | 3.2 | 9.5 | 6.7 | 5.6 | 6.4 | 7.5 | 6.1 |
| 130 | 4.3 | 3.4 | 3.4 | 7.3 | 7.4 | 5.9 | 5.7 | 6.9 | 5.9 |
| 140 | 4.2 | 3.4 | 2.9 | 6.4 | 5.3 | 4.3 | 4.2 | 5.6 | 5.3 |
| Heat Seal Strength | | | | | | | | | |
| 95 | 0.4 | 0.3 | 0.3 | 0.1 | 0.1 | 0.2 | 0.2 | 0.2 | 0.1 |
| 100 | 0.7 | 0.6 | 0.6 | 0.3 | 7.2 | 5 | 3.5 | 0.4 | 0.3 |
| 105 | 1.8 | 1.3 | 1.8 | 8 | 8.2 | 7.9 | 7.6 | 8.5 | 8.9 |
| 110 | 8.5 | 7.2 | 8.2 | 9.8 | 8.9 | 8.8 | 8.5 | 12.1 | 11.8 |
| 115 | 9.6 | 9 | 9.4 | 10.9 | 9.5 | 9.7 | 10.5 | 13.5 | 13.0 |
| 120 | 10.7 | 10.1 | 10.6 | 12.3 | 10.7 | 11.1 | 12.2 | 16.4 | 14.5 |
| 125 | 12.9 | 10.9 | 11 | 11.8 | 11.3 | 11.6 | 11.7 | 15.7 | 15.0 |

TABLE 3B

25 µm mono-layer films:

| Polymer Sample | C<br>MI = 1.0<br>D = 0.918 | D MI = 2.0<br>D = 0.918 | B<br>MI = 1.0<br>D = 0.927 | A<br>MI = 2.0<br>D = 0.927 |
|---|---|---|---|---|
| Film Sample | X | XI | XII | XIII |
| Hot Tack Force | | | | |
| 90 (all in C) | | | | |
| 95 | | | | |
| 100 | 0.3 | 2.2 | | |
| 105 | 3.2 | 9.1 | 0.2 | 0.1 |
| 110 | 6.2 | 8.2 | 0.3 | 0.5 |
| 115 | | | 1.7 | 8.7 |
| 117 | | | | 6.2 |
| 120 | 7.2 | 6.5 | 5.6 | 6.2 |
| 125 | | | 9.1 | 5.2 |
| 130 | 4.9 | 5 | 6.7 | 5.2 |
| 135 | | | 4.9 | 4.7 |
| Heat Seal Strength | | | | |
| 95 | 0 | 0.2 | | |
| 100 | 0.4 | 3.1 | | |
| 105 | 4 | 4.2 | | |
| 110 | 4.7 | 5 | 0.1 | 0.2 |
| 115 | 5.8 | 5.5 | 0.1 | 1.1 |
| 120 | 5.7 | 5.8 | 0.5 | 6.3 |
| 125 | | | 6.3 | 7.2 |
| 130 | | | 7.0 | 6.8 |
| 140 | | | 7.4 | 7.6 |

The hot tack and heat seal strength data are converted into graphs.

FIG. 1 plots the heat seal strength data from Table 3A for 50 µm thick films. Sufficient seal strength is developed at 100° C. and above. With LLDPE grades made from metallocene based catalyst systems, the plots vary with MI. A material improvement is provided by an MI of above 1.5 g/10 min. The Table 3B show that the effect is also observable for films of 25 µm. Table 3B also shows that the shift is observable at different densities.

FIG. 2 plots the hot tack data from Table 3A for 50 µm thick films. The 2.0 MI Exceed grade D provides significant hot tack forces below 105° C. The grade conventionally used for blown film extrusion is the 1.0 MI grade, which develops hot tack only above 105° C. Corresponding LL grades made using a titanium chloride based catalyst do not develop equivalent hot tack forces. Such LL grades do not show significant variations of hot tack with different MI.

FIG. 3 plots the heat seal strength for the blends with 20 wt % LDPE. Addition of such levels of LDPE reduces the beneficial effects of the invention.

We claim:

1. Bag with a heat seal zone, the heat seal zone formed by a composition consisting essentially of an interpolymer of ethylene and an alpha-olefin, wherein the interpolymer has an MI of from 1.5 to 3.5 g/10 min, and a density of from 0.910 to 0.93 g/cm$^3$, and a CDBI of at least 50%, and LDPE in an amount less than 20 wt % based on the total weight of the composition; wherein the maximum hot tack force of the bag is at a temperature of less than 110° C.

2. Bag according to claim 1 in which the interpolymer contains short chain branches derived from an alpha-olefin comonomer having from 4 to 8 carbon atoms.

3. Bag according to claim 1 in which the ethylene interpolymer is characterized by the presence of Zr or Hf catalyst residues.

4. Bag according to claim 1, in which the bag is formed from a multi-layer film having a heat seal zone on at least one side.

* * * * *